(12) United States Patent
Graves

(10) Patent No.: US 9,486,947 B2
(45) Date of Patent: Nov. 8, 2016

(54) PHOSPHORUS TREATMENT AGENT METHODS OF MANUFACTURE AND USE

(71) Applicant: Gregory D. Graves, Milan, OH (US)

(72) Inventor: Gregory D. Graves, Milan, OH (US)

( * ) Notice: Subject to any disclaimer, the term of this patent is extended or adjusted under 35 U.S.C. 154(b) by 119 days.

(21) Appl. No.: 14/041,268

(22) Filed: Sep. 30, 2013

(65) Prior Publication Data

US 2015/0090923 A1    Apr. 2, 2015

(51) Int. Cl.
| | |
|---|---|
| *C02F 1/58* | (2006.01) |
| *B29C 43/00* | (2006.01) |
| *C02F 1/68* | (2006.01) |
| *B29K 105/00* | (2006.01) |
| *C02F 101/10* | (2006.01) |

(52) U.S. Cl.
CPC ............. *B29C 43/003* (2013.01); *C02F 1/688* (2013.01); *B29K 2105/251* (2013.01); *C02F 2101/105* (2013.01)

(58) Field of Classification Search
CPC .............. C02F 5/08; C02F 5/10; C02F 1/52; C02F 1/5272; C02F 1/58; C02F 1/68
USPC ............... 252/175, 180, 181; 210/667
See application file for complete search history.

(56) References Cited

U.S. PATENT DOCUMENTS

| | | | | |
|---|---|---|---|---|
| 5,441,933 A | * | 8/1995 | Lattanzi et al. | ............. 514/11.9 |
| 5,637,308 A | * | 6/1997 | Del Corral | ............. A01N 25/34 |
| | | | | 424/409 |
| 7,063,804 B2 | * | 6/2006 | Landis et al. | ................. 252/176 |

FOREIGN PATENT DOCUMENTS

| | | | | |
|---|---|---|---|---|
| DE | | 3908054 A1 * | 9/1990 | ............ C02F 1/5245 |
| JP | | 2009189955 | * 8/2009 | |

* cited by examiner

*Primary Examiner* — Tanisha Diggs
(74) *Attorney, Agent, or Firm* — Miles & Stockbridge P.C.

(57) ABSTRACT

The invention includes a tablet made from a coagulant that will improve the settling of suspended solids in an aqueous media such as wastewater, recycled water, potable water, storm water, swimming pool water, spa water, boiler water, cooling tower water and industrial process water. The agent is a tablet containing at least one salt from the aluminum sulfate family in a mixture of organic and inorganic binders. The mixed material is especially adapted to lend itself to high speed molding operations. Such agent, when in molded form, provides controlled dissolution in an aqueous media, exhibits strength and non-chipping characteristics which is a benefit in shipping and handling and is free from dusting, flaking or other deteriorative factors. In its tablet form, this agent can be used in combination with a holding apparatus having slotted opening zones.

21 Claims, 7 Drawing Sheets

PHOSPHORUS TREATMENT AGENT METHODS OF MANUFACTURE AND USE

TECHNICAL FIELD

The present invention relates to a particular formulation for a chemical tablet. More particularly, the present invention relates to a chemical tablet that removes phosphorus and provides consistent chemical dissolution in water.

BACKGROUND

Phosphorus (P) is commonly found in municipal and agricultural wastewater, originating from the digestion of phosphorus-containing food sources. Soluble reactive phosphorus, typically in the form of orthophosphate ($PO_4^{+3}$), can be a nutrient for aquatic plants, such as algae, which can be either a health risk to aquatic life or an aesthetic nuisance to those living near or using the waterways. In the case of blue-green algae, toxic by-products can be produced, which create health issues if a lake or reservoir would be used as a source of drinking water.

Control of phosphorus can be achieved by forming a precipitant when the soluble phosphorus, in the form of orthophosphate, combines with a soluble metal, such as aluminum or iron. Several coagulants are also applicable to remove phosphorus from wastewater or sewage.

Aluminum sulfate is commonly used for phosphorus control due to its low metal to phosphorus ratio required for formation of a precipitant. It is widely used in some wastewater treatment plants and municipal sewage treatment plants for removing phosphorus. In these plants, aluminum sulfate needs to be added into wastewater, or secondary treated or tertiary treated effluent in certain methods. The chemical needs to be added to a treatment unit constantly. In on-site sewage treatment plants, it is difficult to use special equipment to add any coagulant for phosphorus removal treatment. Therefore, a special composition, form and method need to be developed to carry out the phosphorus removal task in on-site sewage treatment plants.

SUMMARY

In accordance with one or more embodiments of the present invention, is an aluminum sulfate tablet that can be dissolved into water or wastewater constantly.

In accordance with one or more embodiments of the present invention, is an efficient phosphorus removal system based on the aluminum sulfate tablet.

DESCRIPTION

In accordance with one or more embodiments of the present invention, a composition for and a method to make an aluminum sulfate tablet includes (i.e., comprises) making the aluminum sulfate tablet with a diameter ranging from 1" to 3.5" and a weight ranging from 30 to 200 grams. The tablet is made using granular aluminum sulfate particles with a size ranging from 10 to 200 mesh and a binder or binding agent or an organic bonding material made from plant or plants or a viscosity liquid made from fruits. The bonding material can have a chemical formula of, for example, but not limited to: $C_6H_{12}O_6$ or $C_{12}H_{22}O_{11}$. The bonding material also can be a mixture of these two or more different bonding materials. The bonding material can be, for example, but not limited to, a food grade starch hydrolysate. The food grade starch hydrolysate can be, for example, but not limited to, one of the following starch hydrolysates: Apple, corn, molasses, cane and other binders made from fruits or plants.

While the use of coagulants such as aluminum sulfate to assist in the removal of suspended solids in an aqueous media is well established these coagulants previously have only been available in a granular or pre-diluted liquid form. As a result, using these products required the use of pumps, granular dosing equipment, electricity, and plant modifications. Furthermore, existing dosing systems do not account for variations in the flow rate to be treated, which leads to overdosing of chemical, excess sludge generation and reduced product efficiency.

In this embodiment of the invention, the aluminum sulfate contained within the agent will assist in the precipitating out of phosphorus from domestic wastewater, thereby minimizing the growth of algae in the environment.

The formula and ranges for the components of different embodiments of the tablets are listed in Table 1. In general, the process takes place at ambient temperatures between 60° F. to 90° F.

TABLE 1

Material Ranges of Aluminum Sulfate Tablet

| | Material | | | | | |
|---|---|---|---|---|---|---|
| | $Al_2(SO_4)_3$ Aluminum Sulfate | Aluminum Stearate | Magnesium Stearate | Inert | Binder | $H_2O$ |
| Percentage (%) | 50-92 | 0.3-3.5 | 0.3-10 | 1.0-25 | 2-10 | 6.46 |
| Percentage (%) | 83.9-91.1 | 0.3-1.1 | 0.8-1.8 | 3-5 | 0.3-12 | 4.5-7.0 |

The inert component can include, for example, but is not limited to, Calcium Hydroxide, and the binder component/material can include, for example, but is not limited to, starch hydrolysate.

The tablets can be made using an automated high-speed or manual molding process from the mixed material. For example, but not limited to, an eight-ton arbor press that can be used with at least one die having an internal shape configured to produce a predefined shaped tablet from the mixed material, for example, but not limited to, the tablet shape shown in FIG. 1.

Figure 1:
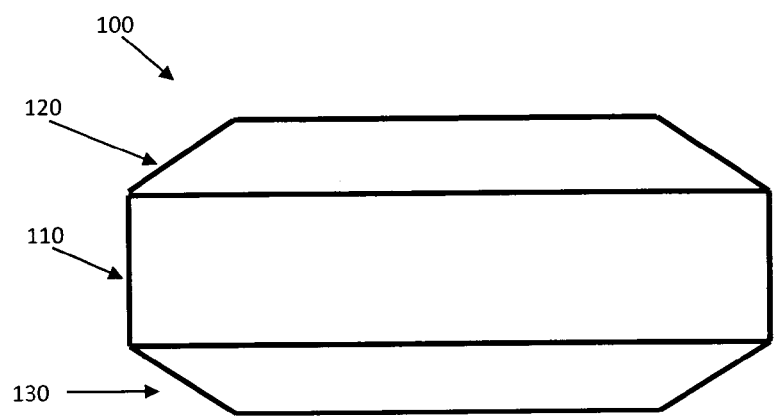
FIG. 1 is a side view of an aluminum sulfate tablet showing a cylindrical central body portion and a large beveled top and a large beveled bottom, in accordance with one or more embodiments of the present invention.

FIG. 1 is a side view of an aluminum sulfate tablet 100 showing a cylindrical central body portion 110, a beveled top 120 and a beveled bottom 130, in accordance with one or more embodiments of the present invention. In FIG. 1, the beveled top 120 and the beveled bottom 130 of the tablet 100 aid in the insertion of each tablet into a feeder device, provide additional surface area for contact by the wastewater as it flows through the feeder, and permit a greater flow rate through the feeder device through the channels created between adjacent tablets by the beveled tops and bottoms.

Still other embodiments of the tablet shown in FIG. 1 can include protrusions on the tops and bottoms of the tablet 100 for example, but not limited to, dimples/bumps, cones, ridges, and the like to provide additional spacing between the tablets to promote water flow and tablet dissolution and to prevent adjacent tablets from becoming stuck together.

Treatment System for Removing Phosphorus. A phosphorus removal system can consist of different combinations of components, but, in general, the removal process includes the following steps:

(1) Flowing water, wastewater or treated sewage through a tablet feeder or a similar apparatus that is filled with the aluminum sulfate tablets made in accordance with this invention to dissolve the tablets into the liquid at a certain dissolve rate.

(2) Optionally, using a mechanical mixer or an air mixing apparatus to mix the liquid that contains the dissolved aluminum sulfate. The purpose of mixing is to accelerate the reaction between the aluminum sulfate and the phosphates. Any mixing method can be applied in this process. As seen, for example, in FIGS. 2 and 3, a pump-diffusion apparatus is applied.

(3) Flowing the treated water to a settling or filtration unit. After the addition of the aluminum sulfate (coagulant), floc grows gradually in this unit and is removed in the settling tank, or clarifier or a filter. The key point of the unit design is that the settling tank volume supplies enough room for chemical sludge storage.

This system contains mixing, flocculation, settling or filtration, or a combined chemical sludge removal unit, and a sludge storage zone.

Figure 2:
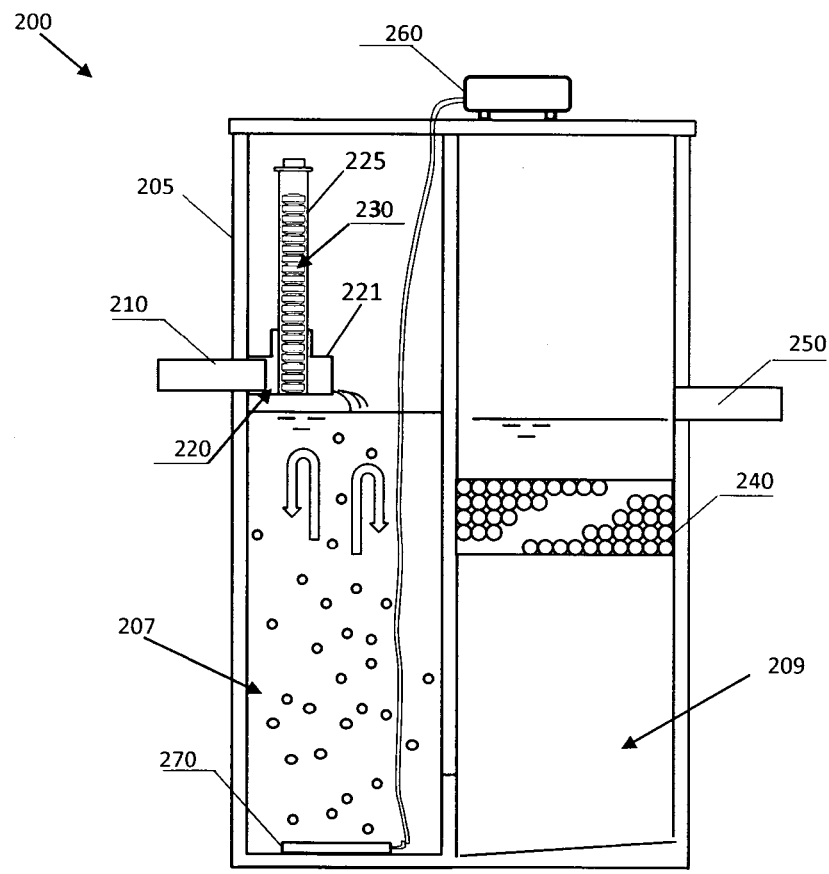
FIG. 2 is a cross-sectional side view of a treatment system with a tablet dispenser unit in which aluminum sulfate tablets shown in FIG. 1 can be used to remove phosphorus from wastewater, in accordance with an embodiment of the present invention.

FIG. 2 is a cross-sectional side view of a treatment system in which aluminum sulfate tablets shown in FIG. 1 can be used to remove phosphorus from wastewater, in accordance with an embodiment of the present invention. In FIG. 2, a treatment system 200 is shown to include a tank 205 through which an inlet pipe 210 passes from an outside of the tank to an inside of the tank. A tablet feeder 220 is connected to an end of and is in fluid communication with the inlet pipe within the tank and the tablet feeder 220 is filled with multiple tablets 230 in, for example, a vertical stack. The tablet feeder 220 includes an upside-down, "T"-shaped base portion 221 and a cylindrical tablet holding portion 225 in which the tablets 230 are stacked. As wastewater flows into the tank 205 through the inlet pipe 210 and the tablet feeder 220 it passes over and dissolves the tablets 230 and spills into a mixing chamber 207 in which an air diffuser 270 is located to provide a mixing action to accelerate the reaction the aluminum sulfate and the phosphates in the water. The air for the air diffuser 270 is provided by an air pump 260 that is, generally, located outside of the tank 205. The treated water then flows into a settling or filtration chamber 209 in which a filtration media 240 is located and through which the wastewater is upwardly filtered to remove the coagulant formed by the reaction of the aluminum sulfate and the phosphates before the filtered water exits through an outlet pipe 250. The coagulant and other sludge solids eventually settle down onto a floor of the settling chamber 209.

Figure 3:
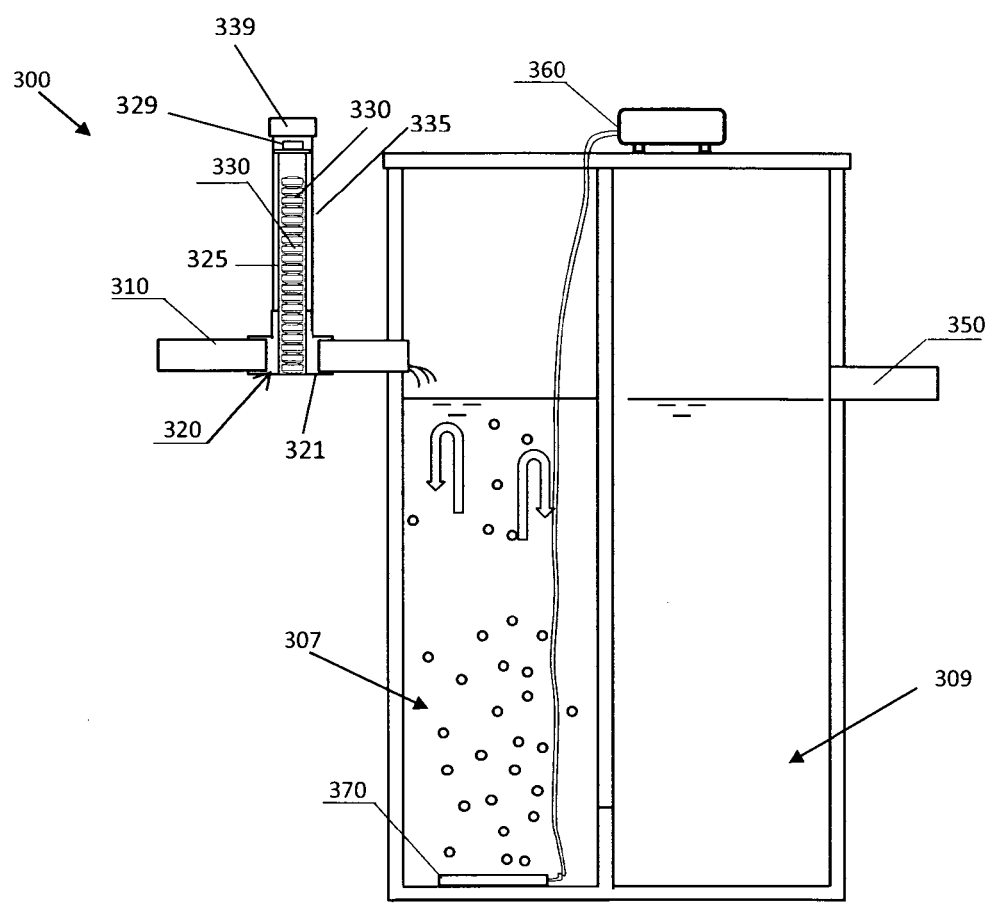
FIG. 3 is a cross-sectional side view of a treatment system with a tablet dispenser unit in which aluminum sulfate tablets shown in FIG. 1 can be used to remove phosphorus from wastewater, in accordance with another embodiment of the present invention.

FIG. 3 is a cross-sectional side view of a treatment system in which aluminum sulfate tablets shown in FIG. 1 can be used to remove phosphorus from wastewater, in accordance with another embodiment of the present invention. In FIG. 3, another treatment system 300 is shown to include a tank 305 through which an inlet pipe 310 passes from an outside of the tank 305 to an inside of the tank. A tablet feeder 320 is located outside of the tank 305 and is connected to an end of and is in fluid communication with the inlet pipe 310 within the tank 305 and a cylindrical tablet tube 325 of the tablet feeder 320 is filled with multiple tablets 330 in, for example, a vertical stack. The tablet feeder 320 includes an upside-down, "T"-shaped base portion 321 and the cylindrical tablet tube 325 in which the tablets 330 are stacked. A cap 329 is located on a top end of the cylindrical tablet tube 325 to close the top end of the cylindrical tablet tube 325. An outer cylindrical tube 335 encircles and covers the cylindrical tablet tube 325 and the cap 329 and a top end of the outer cylindrical tube 335 is similarly covered by an outer tube cap 339. As wastewater flows into the tank 305 through the inlet pipe 310 and the tablet feeder 320 it passes over and dissolves the tablets 330 at a bottom end of the cylindrical tablet tube 325 and spills into a mixing chamber 307 in which an air diffuser 370 is located to provide a mixing action to accelerate the reaction the aluminum sulfate and the phosphates in the water. The air for the air diffuser 370 is provided by an air pump 360 that is, generally, located outside of the tank 305. The treated water then flows into a settling or filtration chamber 309 and exits through an outlet pipe 350 as the coagulant and other sludge solids eventually settle down onto a floor of the settling chamber 309.

Figure 4:
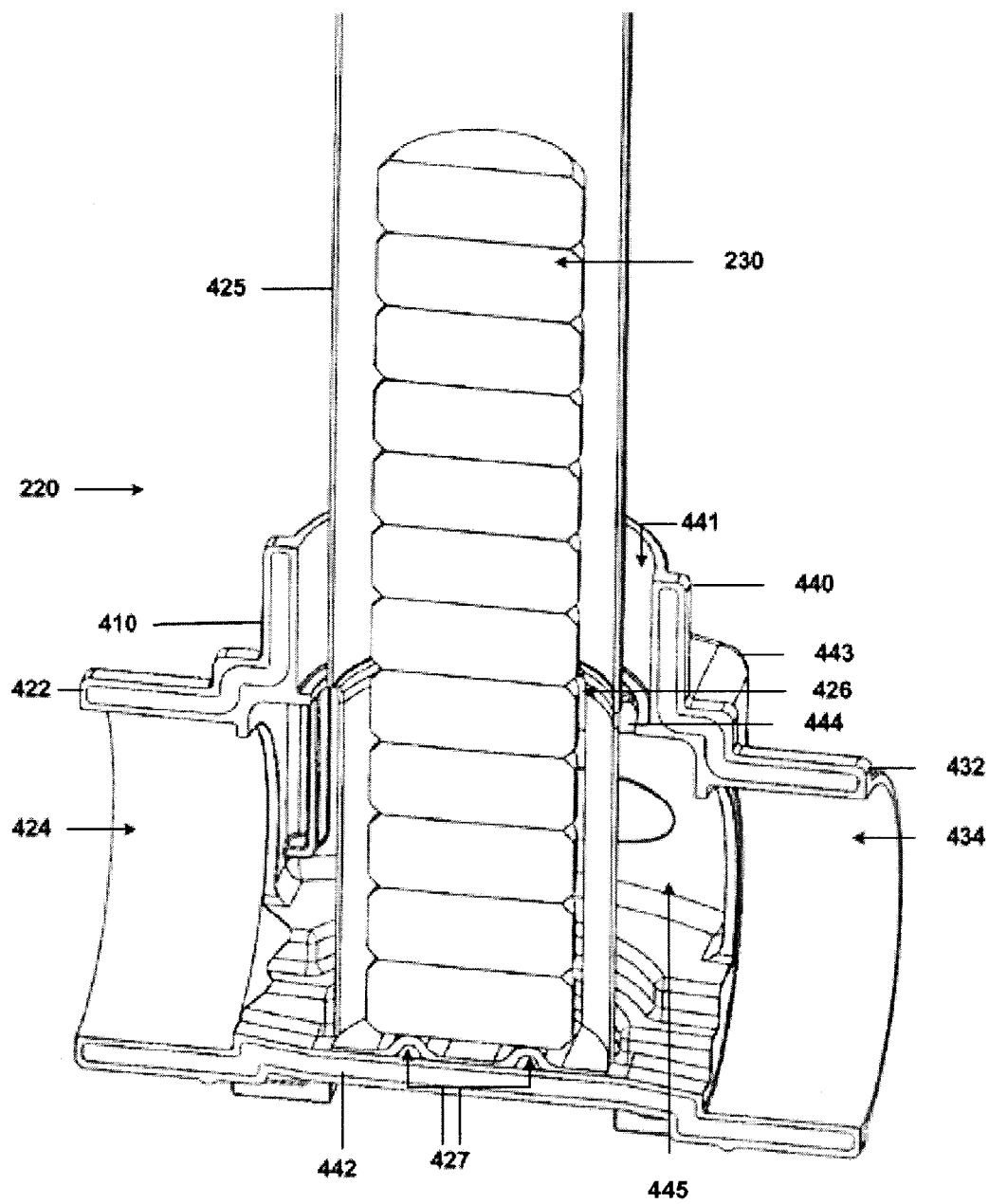
FIG. 4 is a close-up, cross-sectional, isometric view of a bottom portion of the tablet dispenser unit of FIGS. 2 and 3, in accordance with one or more embodiments of the present invention.

FIG. 4 is a close-up, cross-sectional, isometric view of a bottom portion of the tablet dispenser unit of FIGS. 2 and 3, in accordance with an embodiment of the present invention. In FIG. 4, the tablet dispenser 220 includes an upside-down, "T"-shaped base portion 410 and an upright cylindrical tablet holding portion 425 in which the tablets 230 are stacked. The upright cylindrical tablet holding portion 425 includes an open top end (not shown) that is covered with a cap (not shown) and one or more ridges 427 across a bottom of the upright cylindrical tablet holding portion 425 to raise the tablets 230 off the bottom of the upright cylindrical tablet holding portion 425. Raising the tablets 230 off the bottom of the cylindrical tablet holding portion 425 increases the surface area of the bottom tablet 230 that is exposed to the wastewater, which results in better dissolution of the tablets 230. The cylindrical tablet holding portion 425 is installed through a top opening 441 defined by a top cylindrical wall 440 and rests on a bottom wall 442 of the tablet dispenser 220. A sealing member 444, such as, for example, but not limited to, a flexible gasket, fits between an outer surface of the upright cylindrical tablet holding portion 425 and an inside of the top cylindrical wall 440 to form a watertight seal. An opening 426 is defined in and near a bottom of the upright cylindrical tablet holding portion 425 to permit the wastewater to flow into, around and past the tablets 230. In general, a similar opening 426 is also defined on an opposite side of the upright cylindrical tablet holding portion 425. The tablet dispenser 220 also includes an inlet cylindrical wall 422 that defines an inlet opening 424 through which the wastewater flows into the tablet dispenser 220 and opposite to the inlet cylindrical wall 422 is an outlet cylindrical wall 432 that defines an outlet opening 434 through which the wastewater flows into the tablet dispenser 220. The tablet dispenser 220 still further includes a central body portion 443 that defines a central body opening 445 to which are connected and in fluid communication with the inlet opening 424, the outlet opening 434 and the top opening.

Figure 5:
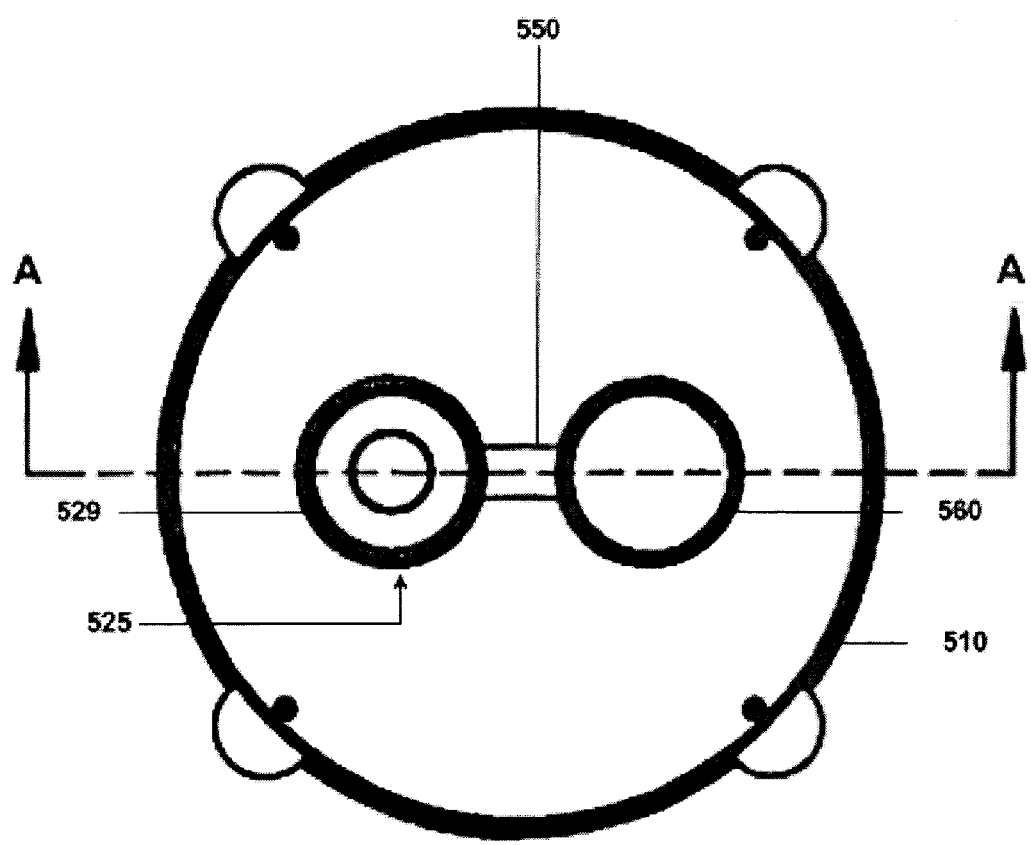
FIG. 5 is a top view of a filtering system in which a tablet dispenser unit is installed, in accordance with an embodiment of the present invention.

FIG. 5 is a top view of a filtering system in which a tablet dispenser unit is installed, in accordance with another embodiment of the present invention. In FIG. 5, a top of a filtering system 510, for example, but not limited to, the Bio-Kinetic Filter system sold by Norweco of Norwalk Ohio, is shown to have protruding from it a cylindrical tablet feeding tube 525 that with its top covered by a removable tablet feeding tube cap 529. The cylindrical tablet feeding tube 525 is located slightly off-center in the top of the filtering system 510. A second cylindrical tube 560 is located along a diameter of the top of the filtering system 510 and is centered approximately an equal distance away from a center of the top of the filtering system 510 as the cylindrical tablet feeding tube 525. A tube 560 is connected between and provides for fluid communication between the cylindrical tablet feeding tube 525 and the second cylindrical tube 560.

Figure 6:
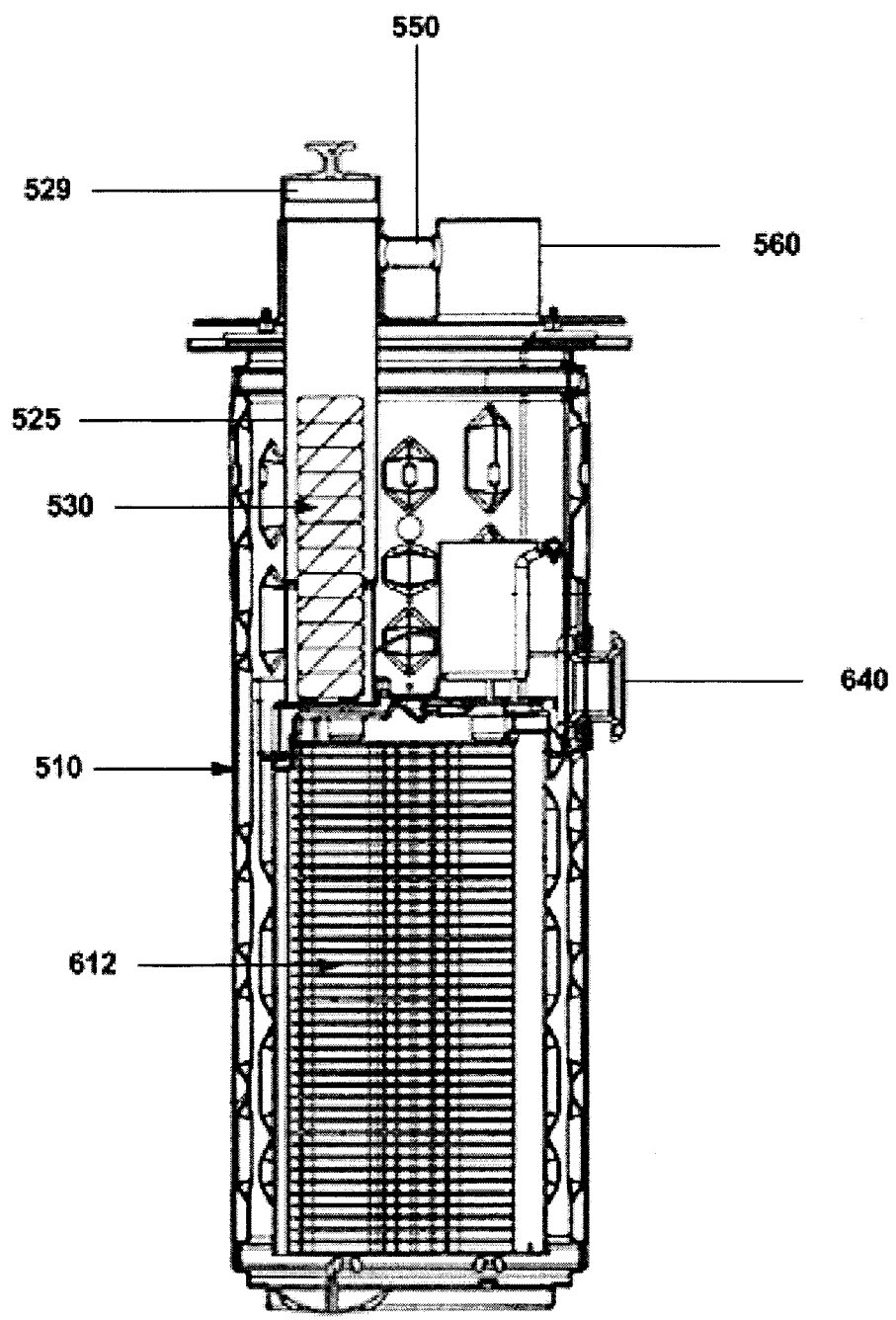
FIG. 6 is a cross-sectional, side view of the filtering system in which a tablet dispenser unit is installed in FIG. 5 along line A-A, in accordance with an embodiment of the present invention.

FIG. 6 is a cross-sectional, side view of the filtering system in which a tablet dispenser unit is installed in FIG. 5 along line A-A, in accordance with another embodiment of the present invention. In FIG. 6, the cylindrical tablet feeding tube 525 is seen holding multiple tablets 530 for treating the wastewater flowing into the filtering system 510 through inlet openings (not shown). The wastewater then passes down through and back up the filter member 612, spills over a flow control weir (not shown) and then passes out of the filtering system 510 through an outlet opening 640.

Test results show that the aluminum sulfate tablets can be used to remove phosphorus successfully in an on-site sewage treatment plant. The removal efficiency is directly based upon the tablets dissolve rate, mixing condition and chemical sludge removal efficiency. Tablets made from the formula shown in Table 2 can remove phosphorus to a low level, for example, the phosphate concentration in the treated effluent can be as low as 0.04 ppm.

TABLE 2

Tablet Formula for Testing

| | Material | | | | | |
|---|---|---|---|---|---|---|
| | $Al_2(SO_4)_3$ Aluminum Sulfate | Aluminum Stearate | Magnesium Stearate | Lime (Inert) | Organic gel forming Binder | $H_2O$ |
| Weight (g) | 124.7 | 1.0 | 2.0 | 6.0 | 1.0 | 9.3 |
| Percentage (%) | 86.60 | 0.69 | 1.39 | 4.17 | 0.69 | 6.46 |

Figure 7:
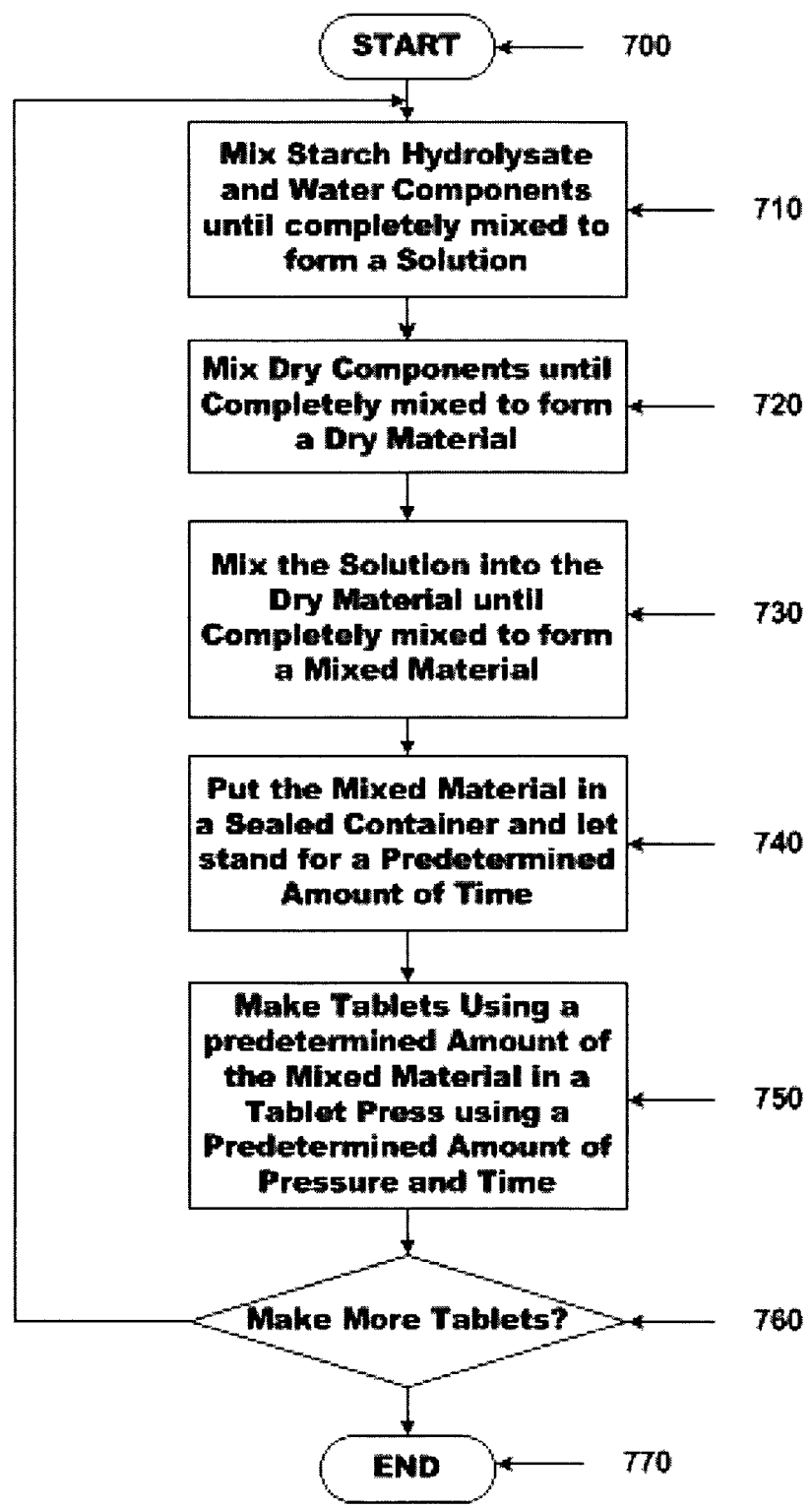
FIG. 7 is a flow chart showing the process for manufacturing a tablet, in accordance with an embodiment of the present invention.

FIG. 7 is a flow chart showing the process for manufacturing a tablet, in accordance with an embodiment of the present invention. As seen in FIG. 7, after the process starts (700) then:

1) The wet components are mixed (710), by combining the binder/binding material, e.g., starch hydrolysate, and the water together until they are completely mixed to form a solution.
2) The dry components are mixed (720) together by combining the aluminum sulfate, aluminum stearate, magnesium stearate and calcium hydroxide together for 1 to 10 minutes to form a dry material. For embodiment 1, the mixing time is 2 minutes to form the dry material.
3) The solution is poured into the dry material and then mixed (730) together for 1 to 10 minutes to form a mixed material. For embodiment 1, the mixing time is 3 minutes to form the mixed material.
4) The mixed material is placed in a sealed container and allowed to stand (740) for 10 to 180 minutes. For embodiment 1, the mixed material is let stand for 40 minutes.
5) A mold in a tablet press is filled with enough of the mixed material to make a tablet and the press is closed and the mixed material is subjected to 5 to 30 tons of pressure for about 1 second to make (750) each tablet. For embodiment 1, the mixed material is subjected to 20 tons of pressure for about 1 second.
6) The newly pressed tablets are now ready for use.
7) If more tablets are to be made (760), then the process returns to mixing (710) the wet components. If not, then the process ends (770).

Two points to evaluate tablet quality are strength of a tablet and dissolve rate of the tablets. Dissolve rate of the tablets is very important to the quality of treated effluent. If the dissolve rate is too high, extra Aluminum Sulfate will be present in the treated effluent. The extra added coagulant affects the formation of the floc and solids removal efficiency. If the dissolve rate is too low, the ratio of Aluminum to Phosphates will be too low to remove phosphorus efficiently. Therefore, the composition of the tablets is important. The formula of the tablets can be adjusted based on the characteristics of the wastewater or sewage to be treated.

While the invention(s) has/have been described in conjunction with a number of embodiments, it is evident that many alternatives, modifications and variations would be or are apparent to those of ordinary skill in the applicable arts. Accordingly, Applicant intends to embrace all such alternatives, modifications, equivalents, and variations that are within the spirit and scope of the invention(s) described herein.

What is claimed is:

1. A treating agent for extended time release and controlled dissolution in a liquid media, the treating agent consisting of greater than 50 weight percent aluminum sulfate, aluminum stearate, magnesium stearate, lime, water and a starch hydrolysate, wherein the treating agent is formed from a blended and compacted moist mix.

2. The treating agent of claim 1 wherein the aluminum sulfate is present in an amount of between 85 and 90 weight percent.

3. The treating agent of claim 1 wherein the aluminum stearate and magnesium stearate are present in an amount of about 2 weight percent.

4. The treating agent of claim 1 wherein the lime is present in an amount of about 4 weight percent.

5. The treating agent of claim 1 wherein the binder is present in an amount of less than 1 weight percent.

6. The treating agent of claim 1 wherein the water is present in an amount of between 6 and 7 weight percent.

7. The treating agent of claim 1 consisting of 86.6 weight percent aluminum sulfate, 0.69 weight percent aluminum stearate and 1.39 weight percent magnesium stearate, 4.17 weight percent lime, 0.69 weight percent starch hydrolysate, and 6.46 weight percent water.

8. An agent in solid, compacted and tableted form and having time release and controlled dissolution in liquid media, said tablet form being substantially cylindrical in shape with a diameter of 2.5 inches to 3 inches and a maximum thickness of 1" with the agent consisting of aluminum sulfate in an amount greater than about 50 weight percent basis aluminum stearate, magnesium stearate, lime, water and a starch hydrolysate.

9. The agent in solid, compacted and tableted form of claim 8 wherein the tablet has opposing beveled edges around a top end and a bottom end of the tablet.

10. The agent in solid, compacted and tableted form of claim 9 wherein the height of a center portion of the agent in solid, compacted and tableted form is less than the combined height of the beveled edges.

11. The agent in solid, compacted and tableted form of claim 8 wherein the height of a center portion of the agent in solid, compacted and tableted form is greater than the combined height of the beveled edges.

12. A moist mixture consisting of aluminum sulfate aluminum stearate, magnesium stearate, lime, water and a starch hydrolysate, wherein the moist mixture is compacted into hard, self-supporting articles, under high pressure molding techniques into hard tablets that will not chip, retain their shape, and are free from dusting.

13. The moist mixture of claim 12 consisting of:
86.60 weight percent of aluminum sulfate;
0.69 weight percent of aluminum stearate;
1.39 weight percent of magnesium stearate;
4.17 weight percent of lime;
0.69 weight percent of the starch hydrolysate; and
6.46 weight percent of water.

14. An apparatus comprising:
a cylindrical shaped tablet consisting of at least 50% weight basis aluminum sulfate aluminum stearate, magnesium stearate, lime, water and a starch hydrolysate; and
a holding apparatus having a slotted end zone, the holding apparatus configured to receive the cylindrical shaped tablet.

15. The apparatus of claim 14 wherein the tablet consists of:
86.60 weight percent of aluminum sulfate;
0.69 weight percent of aluminum stearate;
1.39 weight percent of magnesium stearate;
4.17 weight percent of lime;
0.69 weight percent of the starch hydrolysate; and
6.46 weight percent of water.

16. A method of making a treating agent for extended time release and controlled dissolution in liquid media of claim 1, the method comprising: blending aluminum sulfate, magnesium stearate, aluminum stearate, lime and less than 10% added moisture.

17. A method of making a treating agent for extended time release and controlled dissolution in liquid media of claim 1, the method comprising:
mixing predetermined amounts of a binding material and water together until they are completely mixed to form a solution;
separately mixing predetermined amounts of aluminum sulfate, aluminum stearate, magnesium stearate and calcium hydroxide together for 1 to 10 minutes to form a dry material;
pouring the solution into the dry material and mixing them together for 1 to 10 minutes to form a mixed material;
placing the mixed material in a sealed container and allowing the mixed material to stand for 10 to 180 minutes;
filling a mold in a tablet press with a predetermined amount of the mixed material, closing the press and subjecting the mixed material to 5 to 30 tons of pressure for about 1 second to make a tablet.

18. The method of making a treating agent for extended time release and controlled dissolution in liquid media of claim 17 wherein the mixing time to form the dry material is 2 minutes.

19. The method of making a treating agent for extended time release and controlled dissolution in liquid media of claim 17 wherein the mixing time to form the mixed material is 3 minutes.

20. The method of making a treating agent for extended time release and controlled dissolution in liquid media of claim 17 wherein the mixed material is allowed to stand in the sealed container for 40 minutes.

21. The method of making a treating agent for extended time release and controlled dissolution in liquid media of claim 17 wherein the press is closed and the mixed material is subjected to 20 tons of pressure for about 1 second to make each tablet.

\* \* \* \* \*